April 16, 1929.   R. L. GRUSS   1,709,313
AIR SPRING
Filed Feb. 28, 1924
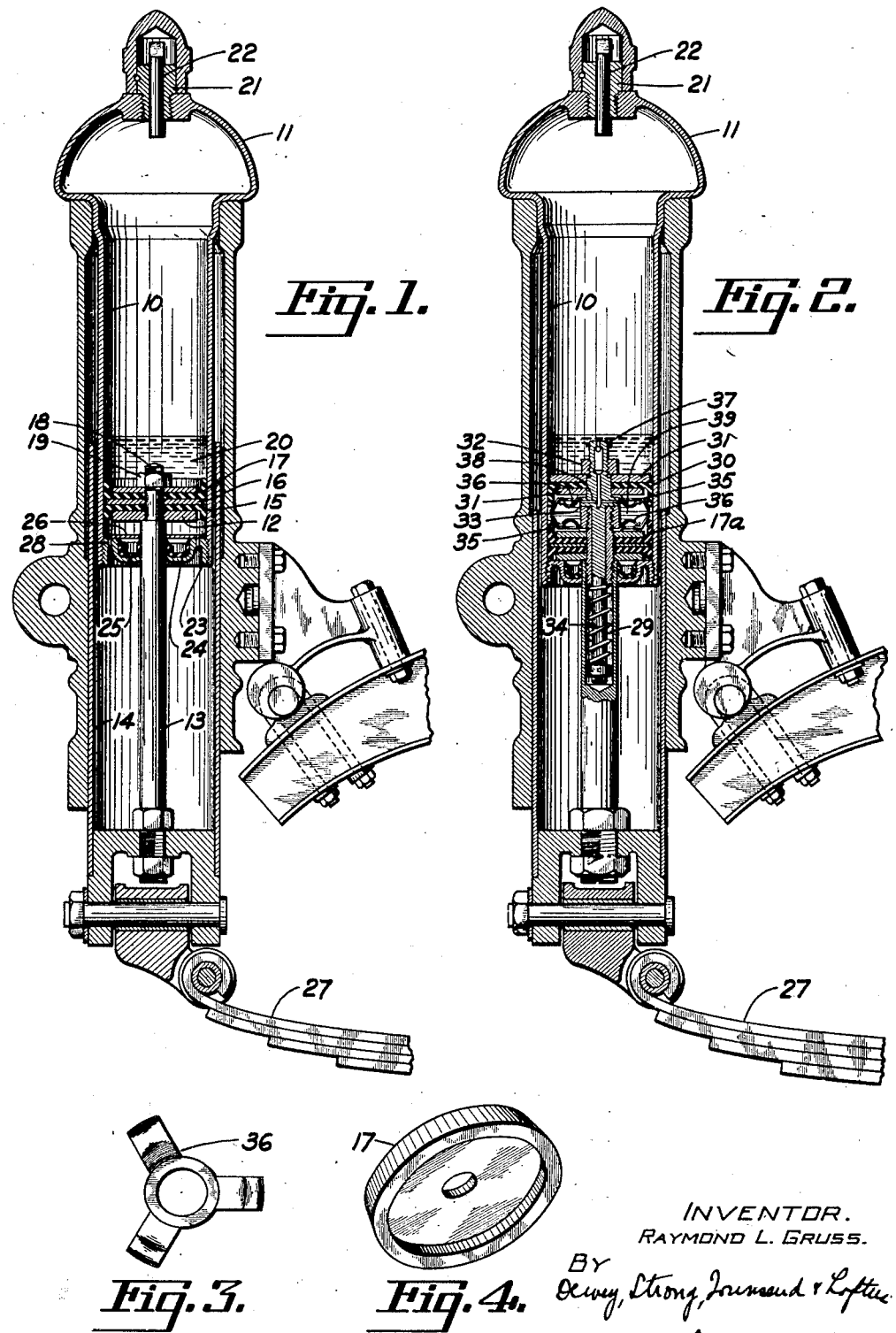
INVENTOR.
RAYMOND L. GRUSS.
BY
ATTORNEYS.

Patented Apr. 16, 1929.

1,709,313

UNITED STATES PATENT OFFICE.

RAYMOND L. GRUSS, OF SAN FRANCISCO, CALIFORNIA.

AIR SPRING.

Application filed February 28, 1924. Serial No. 695,665.

This invention relates to air springs for vehicles, and more particularly to that type of air spring having a piston working in a cylinder. Air springs of this type as at present constructed employ telescopic cylinders, and they are rather expensive, owing to the large number of parts and the labor required in machining and assembling these parts. Their use, therefore, is confined almost wholly to large and expensive automobiles and trucks.

The object of the present invention is to provide an air spring of this character which will be sufficiently inexpensive to construct and assemble to adapt it to automobiles of the cheaper class.

In the present invention I make use of a cylinder adapted to be connected to the frame of the axle. Slidably fitted within the cylinder is a piston, having a rod connected with the axle of the vehicle by means of a leaf-spring or otherwise. The piston carries a novel arrangement of packing members having sliding contact with the cylinder walls and lubricated by oil or grease introduced at the top of the cylinder. The space above the piston contains air under pressure, and constitutes the cushioning chamber. The lower end of the cylinder carries a packing arrangement which makes sliding contact with the piston rod, and forms between the ring and the lower end of the piston a chamber for cushioning the recoil.

In the accompanying drawings, Fig. 1 shows a vertical central sectional view of an air spring embodying the preferred form of my invention.

Fig. 2 shows a similar view of a modified form of my invention.

Fig. 3 shows a plan view of one of the metallic spring members used in the device of Fig. 2, for expanding the packing members.

Fig. 4 shows a perspective view of a cup-shaped packing member employed in my device.

Referring particularly to the device shown in Fig. 1, a cylinder 10 is provided, which cylinder has a closed upper end 11. Within the cylinder is a piston 12, carried upon a rod 13, which rod is preferably arranged within a housing 14. The piston carries on its upper face a down-turned cup-shaped packing member 15, having sliding contact with the cylinder walls. Overlying this packing member is a spacing-plate 16, and on top of the latter is an up-turned cup-shaped packing member 17. Preferably this last-named packing member is formed of composition rubber, which because of its inherent expansibility will maintain a close fit with the walls of the cylinder without the necessity for mechanical expansion means. These packing members and the plate 16 are held in place on a stem 18 by means of a nut 19.

A well of oil, as indicated at 20, is maintained within the cylinder to receive the packing members and to lubricate the sliding surface. This oil is introduced through an opening in the top of the cylinder, which opening is closed by a plug 21. Said plug is provided with an air-valve 22 by which air is supplied to inflate the spring.

The lower end of the cylinder 10 has a ring or flange 23, screw-threaded thereon, and formed with a seat 24 for a packing member 25. This packing member has an upturned lip in sliding contact with the piston-rod 13, and is held in place by a plate 26 riveted to the ring or flange 23.

In the operation of the spring just described, the cylinder 10 is connected by a suitable bracket with the frame of the vehicle, and the housing 14, to which the piston-rod 13 is rigidly connected, is suitably connected to the axle of the vehicle, preferably through a leaf-spring 27. The cylinder and piston are then collapsed and the required amount of oil is introduced through the opening in the top of the cylinder to supply the seal or well 20. The plug 21 is then put in place and air is introduced under pressure until the cylinder and piston are sufficiently expanded to support the load on a cushion of air. Owing to the disposition of the up-turned cup-shaped packing member 17 and its tendency to expand into close contact with the cylinder walls, the oil in the seal will not leak past the sliding joint. Such oil as escapes when extremely high pressures are applied thereto under the force of a shock, will find its way into the space between the packing member 15 and the packing member 25, and there serve to lubricate the sliding surfaces and also act as a seal when a severe shock is encountered, the cylinder and piston together compressing the air and absorbing the shock. During this movement the space between the packing members 15 and 25 will be enlarged, causing a slight vacuum therein which will cause air to be drawn into this space from the exterior. The air so drawn in will pass the up-turned packing member 25 and relieve the vacuum in the over-lying space. Therefore, on the rebound the air in this space will be compressed, and thus serve to check the recoil. In this connection it will be understood that due to the disposition of the edges of the cup-shaped members 15 and 25, air may enter from below the packing member 25, and once in the over-lying space can not readily escape in either direction. For this reason I find it advisable to provide the flange or ring 23 with a relief or vent opening 28, whereby the entrapped air may escape and permit the cylinder and piston to return slowly to an expanded position.

In the modification shown in Fig. 2, I employ a piston-rod which is made hollow or in the form of a tube, to receive a plunger 29. This plunger extends up through the head of the piston and carries a down-turned cup-shaped packing member 30, which is in sliding contact with the cylinder wall above the packing member 17$^a$, which corresponds to the packing member 17 of Fig. 1. This packing member 30 is clamped in place by means of clips 31 and a nut 32. The said plunger 29 has a shoulder 33 which supports the lower plate 31 and is adapted to contact with the top of the piston so as to limit the downward movement of the plunger. A spring 34 is coiled around the lower end of the plunger and abuts against the piston-head so as to exert a downward pressure on the plunger tending to maintain it yieldingly in retracted position. The two packing members 17$^a$ and 30 are pressed outwardly by wedge-rings 35, which rings are acted upon by spider-like springs 36, the form of said springs being best shown in Fig. 3. The top of the plunger has a fitting 37 to receive a grease-gun. This fitting opens into ducts 38 leading through the plunger and its shoulder 33, and discharging into the space 39 between the packing members 17$^a$ and 30.

In the operation of this form of the invention the plug in the top of the cylinder is removed, so as to permit a grease-gun to be connected to the fitting 37 when the cylinder and piston are collapsed. Thereby grease is shot into the space 39, the plunger moving upwardly against its spring to accommodate any desired charge of grease. This grease will serve to lubricate the sliding surfaces between the packing members and cylinder wall, and will also act as a seal against the escape of air from the cushion chamber. The spring-pressed plunger will keep this grease well compacted. In other respects the operation of this form of the invention is identical with the operation of the device of Fig. 1.

It will be seen from the foregoing that I have provided an extremely simple and rugged construction for an air spring of the cylinder and piston type, which affords not only a large compression chamber for the air, but also a chamber to check the recoil of the spring. The device requires but a small amount of oil or grease, and there is little or no leakage of such oil or grease. The important advantage of this construction, however, is the small amount of machine-work which is involved in its manufacture. In prior devices of this general nature the telescopic cylinders have to be carefully machined, and this adds considerably to the cost of the job. In the present device the only machining required is that of the inner walls of the cylinder 10 and the exterior walls of the piston-rod. Where a housing such as indicated at 14 is employed, it may have a very loose sliding fit with the cylinder 10, and therefore need not be machined.

Various changes in the construction and arrangement of the several parts shown and described may be employed without departing from the spirit of my invention as disclosed in the appended claims.

What I claim and desire to secure by Letters Patent is:

1. In an air spring for vehicles, a cylinder closed at its top and adapted to be connected to one element of the vehicle, a piston working in the cylinder and carried by a rod connected with another element of the vehicle, spaced packing members on the piston, the upper one having an up-turned marginal flange and the lower one having a down-turned marginal flange, and a packing member on the lower end of the cylinder having an up-turned marginal flange in sliding contact with the rod, and forming with the lower packing member on the piston an enclosed space to serve as a recoil check, and a spring-pressed movable member on top of the piston, and a packing member carried thereby and formed with a down-turned marginal flange, and means for introducing a semi-solid lubricant between said last-mentioned packing member and the packing member immediately below.

2. In an air spring, a cylinder adapted to be connected to one element of a vehicle, a piston working in said cylinder, a hollow rod for the piston, adapted to be connected to another element of the vehicle, spaced packing members on the piston, the upper formed with an up-turned marginal flange and the lower one formed with a down-turned marginal flange, a plunger fitted within the hollow rod, a packing member carried by the plunger and formed with a down-turned marginal flange, said last-named packing member being disposed above the piston, spring means on the plunger for moving the same downwardly, means for introducing a semi-solid lubricant between the packing member on the plunger and the upper packing member on the piston.

RAYMOND L. GRUSS.